(12) United States Patent
Mossey

(10) Patent No.: US 6,282,834 B1
(45) Date of Patent: Sep. 4, 2001

(54) INSULATING LIGHT TRANSMISSIVE AND FLEXIBLE GREENHOUSE COVER

(76) Inventor: Clifford L. Mossey, 64 S. Peru St., Plattsburgh, NY (US) 12901

( * ) Notice: Subject to any disclaimer, the term of this patent is extended or adjusted under 35 U.S.C. 154(b) by 0 days.

(21) Appl. No.: 09/317,283

(22) Filed: May 24, 1999

(51) Int. Cl.$^7$ .................................................. A01G 9/00
(52) U.S. Cl. .................... 47/17; 47/26; 47/28.1; 47/29
(58) Field of Search .................. 47/17, 26, 28.1, 47/29, 31, 32.1, DIG. 6; 52/81.4, 63

(56) References Cited

U.S. PATENT DOCUMENTS

| | | |
|---|---|---|
| 3,339,309 * | 9/1967 | Stone ........................ 47/28.1 |
| 3,375,321 * | 3/1968 | Laing ........................ 47/28.1 |
| 3,812,616 * | 5/1974 | Koziol ....................... 52/63 |
| 4,012,867 * | 3/1977 | Lainchbury et al. .......... 47/17 |
| 4,068,421 * | 1/1978 | Marovich .................... 52/81.4 |
| 4,375,232 * | 3/1983 | Heescher et al. ............ 160/84.06 |
| 4,560,609 * | 12/1985 | Fukushima et al. ........... 428/220 |
| 4,577,436 * | 3/1986 | Dalle ........................ 47/17 |
| 4,886,561 | 12/1989 | Rohweder et al. . |
| 5,140,768 | 8/1992 | Forbes . |
| 5,256,462 | 10/1993 | Callahan et al. . |
| 5,519,964 | 5/1996 | Kujirai et al. . |
| 5,580,620 | 12/1996 | Campbell et al. . |
| 5,813,169 | 9/1998 | Engerman . |

* cited by examiner

Primary Examiner—Charles T. Jordan
Assistant Examiner—Judith A. Nelson
(74) Attorney, Agent, or Firm—Randall L. Reed; Levin & Hawes LLP

(57) ABSTRACT

A light transmissive thin flexible covering for a greenhouse having two outside sheets. The two outside sheets have sandwiched there between an array of chambers which connect and hold the sheets together, the chambers are sealed and generally contain air and thus provide an insulating space. The cover can be placed or rolled over the framework of a greenhouse to provide an enclosed thermally insulated space. The structure of a greenhouse generally comprises an array of sequentially arched support rods or pipes. The support rods or pipes at either end have a base plate to which they attach. The ends of the structure are sealed to provide a completely enclosed interior space to protect plants during cold weather. The cover has ultraviolet reflective qualities which prevent the penetration of ultraviolet light into the interior or the degradation of the cover due to ultraviolet light.

20 Claims, 3 Drawing Sheets

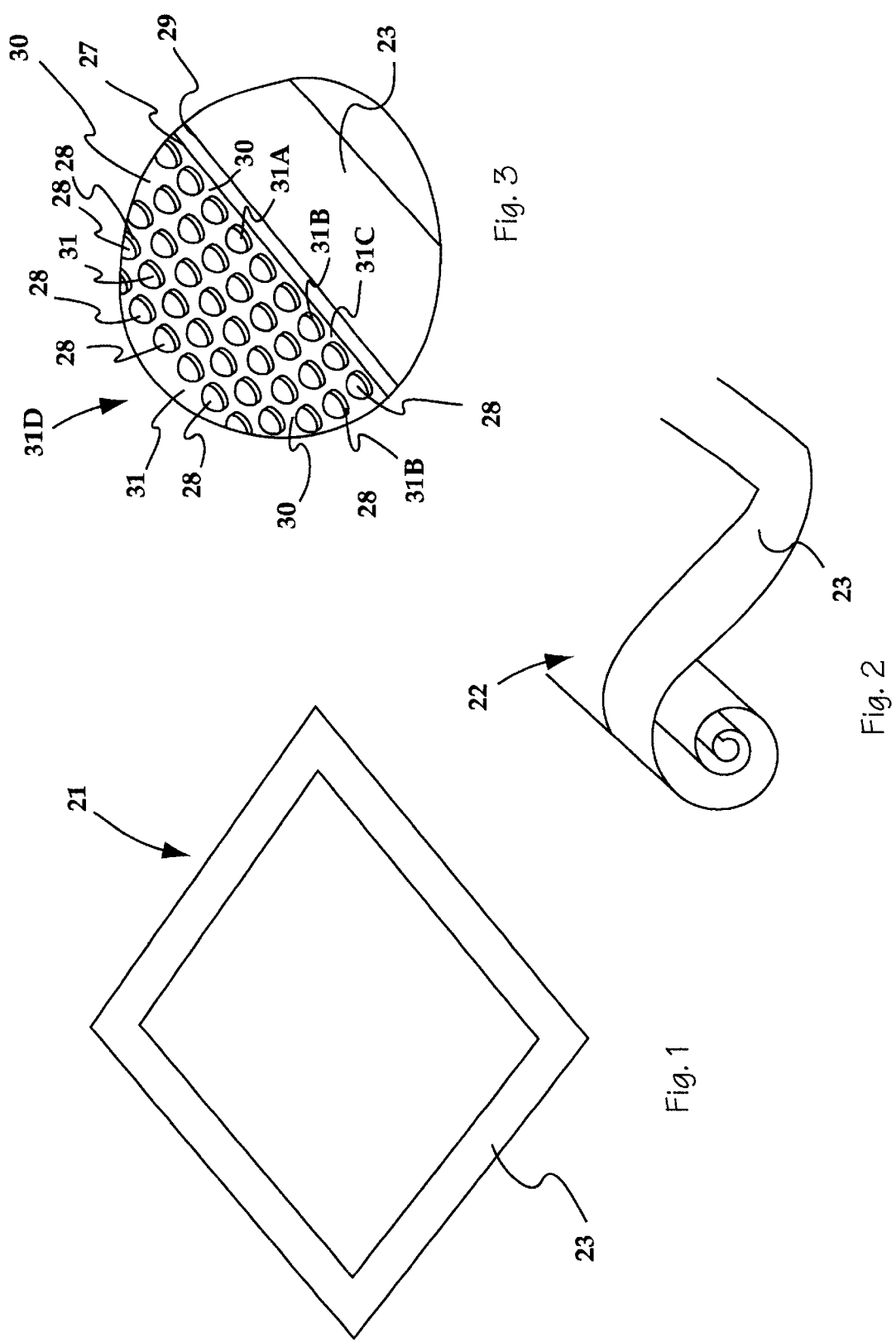

INSULATING LIGHT TRANSMISSIVE AND FLEXIBLE GREENHOUSE COVER

FIELD OF THE INVENTION

The invention relates to a tranparent or tranlucent insulating cover for a greenhouse. More particularly it relates to a thin flexible transparent or translucent insulating cover for a green house.

BACKGROUND OF THE INVENTION

Growing plants in a green house has been a well known technology used for centuries. The key element of a green house is its covering which must be transparent or tranlucent but still be able to retain a significant portion of the heat generated by the sun or other means in the green house. Improved technology for the production of glass, especially economical production of large thin sheets has certainly advanced the use of green houses.

The advent of a thin plastic film has resulted in a widespread adoption of these films as a preferred covering for commercial green houses. Thin plastic films, which can be made in extremely large sheets and which can cover large square surface areas, are much lighter and much less expensive than glass. However, one of the deficiencies of thin plastic sheets are their thinness which results in a lack of heat retention capabilities which other alternatives, such as glass have. Also, due to exposure to the elements, in particular ultraviolet radiation, the plastic films generally have a relatively short life when used outside. Use of ultraviolet (UV) reflective or protective barriers has to some extend alleviated this problem.

A number of attempts have been made to improve the heat retention ability of thin plastic film. One widespread technique currently used by greenhouse owners is to place two sheets of thin plastic film over the framework of a green house and blow air in between them. The edges of the two sheets of plastic film are secured together at the appropriate places providing the sealed chamber necessary to contain and maintain inflation. However, the deficiency of this method is the requirement of the constant air pressure between the two sheets to maintain inflation and thus the space between the sheets which creates the insulating effect. If the seal happens to break at any point air pressure will fall and the inflation which maintained the separation of the sheets will be lost. Attempts have been made to solve this problem with more rigid plastic panels which have air spaces created between sheets of rigid polycarbonate plastic which make up the panel. However, this technology has its own problems and deficiencies, among them the need for more permanent structures to bear the weight of the panels

SUMMARY

Thus it is an object of the present invention to provide a thin flexible relatively inexpensive covering for a greenhouse. A covering for a greenhouse which not only provides superb insulating effects but can be easily placed or rolled over the top of a greenhouse structure and when required be just as easily unrolled or removed from the greenhouse during warm weather.

It is an additional object of the present invention to provide a covering which reflects back ultraviolet light but allows all other wave lengths of light to pass through the covering. It is an additional object of the present invention to provide a covering which does not suffer degradation in the presence of ultraviolet light.

It is a further object of the present invention to provide a method and apparatus which will allow a hobby gardener or a small commercial operation to set up and maintain an economical, effective and easily maintained greenhouse that can be used year round.

The above objectives and other objectives are accomplished by providing a thin flexible light transmissive insulating cover for a greenhouse. The covering having two thin flexible sheets which have sandwiched between them an array of chambers. The chambers provide an insulating space generally containing air. The walls of the chambers form a foldable moveable connection between the two sheets which allows the cover to be rolled, folded or spread out. At least one of the sheets is reflective of ultraviolet light and both sheets and the walls of the chambers allow the passage of light. Thus, when the covering is spread over a framework of a greenhouse it provides a barrier which allows the passage of sunlight into the interior of the greenhouse except for ultraviolet light, which it reflects, and insulates the interior of the greenhouse from loss of heat.

In an additional aspect of the present invention, the chambers are formed in a regular array. In yet another aspect of the invention, the chambers are sealed and contain air which thus forms the insulating layer.

In yet another aspect of the present invention, the cover allows the passage of infrared radiation into the interior of the greenhouse but reflects infrared radiation back into the interior of the greenhouse thereby helping to contain infrared radiation in the interior of the greenhouse.

In an additional aspect of the present invention the greenhouse structure is made up of a framework over which the cover can be spread, the framework being formed of a multitude of thin narrow flexible suspension arches positioned in a sequential array, each suspension arch having two ends which are secured in place so that when the cover is spread out over the arched array it forms a canopy over the space beneath the arched array.

In yet a further aspect of the present invention it has a first base plate to which the first end of each suspension arched of the arched array is secured and a second base plate to which a second end of each suspension arch of the arched array is secured and the canopy formed by the arched array encloses an interior space accessible to light through the covering. In yet a further aspect of the invention the ends of the greenhouse structure are sealed at both ends with a doorway at one end for accessing the interior of the greenhouse.

In yet another aspect of the present invention the thin narrow flexible suspension arches can be thin narrow flexible PVC piping or aluminum electrical conduit type piping or tubing.

In yet another aspect of the invention the UV reflective layer is a separate thin flexible transparent or translucent sheet reflective of UV radiation placed over the cover.

In yet a further aspect of the invention it provides a method for providing a year around greenhouse with a thin light flexible easily removed cover, the method consisting of the steps of providing a greenhouse cover made up of at least two thin flexible sheets of translucent or transparent material, said sheets having an array of chambers positioned there between which connect the sheets to each other; providing a modular support structure with a plurality of arches in a sequential array of arches with a first base plate at a foot of a first end of said arches and a second base plate at a second end of the arches; spreading the cover over the array of arches to provide a covered interior space beneath the arches; sealing off a first end and a second end of the arched array to thereby create a protective insulated light accessible interior beneath the arched array.

BRIEF DESCRIPTION OF THE DRAWINGS

The invention will be better understood by an examination of the following description, together with the accompanying drawings, in which:

FIG. 1 provides a view of the thin flexible cover of the present invention spread out;

FIG. 2 provides an end view of a roll of the thin flexible cover of the present invention;

FIG. 3 provides a close up view of the section of the thin flexible cover surrounded by circle I in FIG. 1;

DETAILED DESCRIPTION OF THE PREFERRED EMBODIMENT

Figure 5:
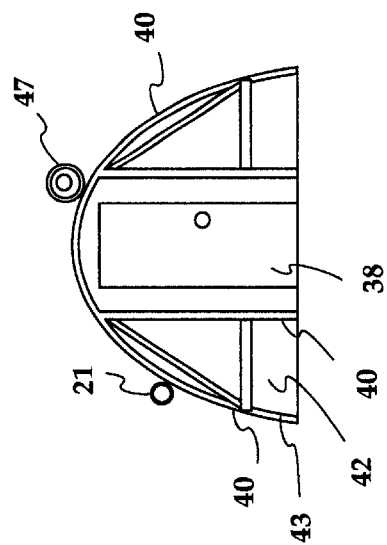
FIG. 5 provides an end view of a green house using the present invention.

FIG. 1 provides a perspective view of the covering 21 of the present invention laid out. Typically it can be a sheet or cover measuring twenty-one feet by one hundred feet. It will be composed of polyethylene, polypropylene or some other similar like film used to make transparent plastic sheeting. When used it will be laid out over the framework of a greenhouse as will be described in more detail below. However, when shipped or stored it would be in the form of a roll 22 as depicted in FIG. 2.

FIG. 3 provides a magnified view of a portion of the covering 21. In the preferred embodiment the covering 21 is made up of two sheets 27 and 29 of plastic film. Sandwiched between the two sheets 27 and 29 are chambers 28 and the area 30 between the sheets 27 and 29 outside of the chambers 28. The sides of the chambers 31B in effect form the connection between the two sheets 27 and 29. The construction of the covering 21 in its preferred embodiment is equivalent to the structure of double layer plastic bubble wrap used for wrapping and protecting items during shipping. A number of different ways exist to manufacture the double layer plastic bubble wrap. One common method is to in effect use three sheets of plastic film. Two sheets form the outside layers 27 and 29 while the bubble like structures are formed on the middle third layer 31 which is sandwiched between the two outside layers 27 and 29. In one configuration a portion of the middle third layer 31 connects generally in a circular area 31A and a regular array to one of the outside layers 27 with the remainder of the inner third layer forming either the sides 31B of the chamber 28 or attaches 31C to the second outside layer 29. This construction in effect creates a regular array of what appear to be bubbles sandwiched between the two outside layers 27 and 29.

Thus, the bubbles or chambers 28 in the structure of the preferred embodiment form an array 31D which looks like a honeycomb. The sides 31B of the chamber 28 form the portion of the chambers 28 which connect the two opposite side sheets together. This connection also forms the necessary space between the two sheets 27 and 29. The chamber 28 in the preferred embodiment are filled with air and sealed. The area outside 30 of chamber 28 is also filled with air. In the preferred embodiment the chambers 28 are circular and range from a quarter of an inch to a half inch in diameter (¼" to ½"). The chambers 28 in the preferred embodiment are separated from each other by a sixteenth to an eighth of an inch (1/16" to ⅛") in rows. However, those skilled in the art will appreciate after reviewing this specification that the size of the sealed chambers 28 can vary significantly and the arrangement of the array 31D can be varied significantly without departing from the concept of the invention. The shape of the Chambers 28 can also be varied significantly to rectangular, triangular, hexagon, octagon, etc. without departing from the concept of this invention.

In the preferred embodiment of the invention the bubbles or chambers do not extend to the edge of the material. They end ideally about six (6") inches from the edge and the sheets of plastic 27, 29 and 31 are joined together to form a flat, chamberless or bubble free border 23, see FIGS. 1, 2 and 3. The border 23 makes it easier to secure the cover 21 once it is placed over the greenhouse structure as will be discussed below. The border also provides a reinforced edge 23.

Since the sheets of the covering are sealed together at their edges air cannot escape and it forms a flexible transparent covering 21 which can be rolled up or laid out. The trapped air thereby provides the insulating property of the covering 21 and gives the covering a semi inflated aspect. In the preferred embodiment the layers of plastic film 27, 29 and 31 would be from three to six (3 to 6) mils thick.

When the cover is made with the reinforced edge 23 the entire cover is sealed and air is trapped both inside the chambers 28 and outside of the circular chambers 30. If the sealed edge is cutoff at some point or the sheets are pierced at any point air will escape from the area 30 around the chambers. However, even if there is a loss of the seal holding in air in the area 30 around the chambers, the chambers themselves 28 are individually sealed. Thus chambers 28 will continue to provide the necessary separation between the two outer layers 27 and 29 of the cover 21. Loss of a seal for the air in area 30 around the chambers 28 will not diminish the effectiveness of the cover 21. Nor would a loss of seal in some of the chambers 28 significantly diminish the heat retention capabilities of the cover 21. The size and structure of the array would prevent or at least significantly retard movement of air within the cover 21. Thus, the cover 21 will continue to provide the dead space necessary to create the insulting effect.

It will be appreciated that other gases, in particular inert gases, could be used in place of air to create the "dead space" for the insulating effect. Argon, $CO^2$ etc. could possibly be used. However, as a practical and economic matter air is used in the preferred embodiment.

Figure 4:
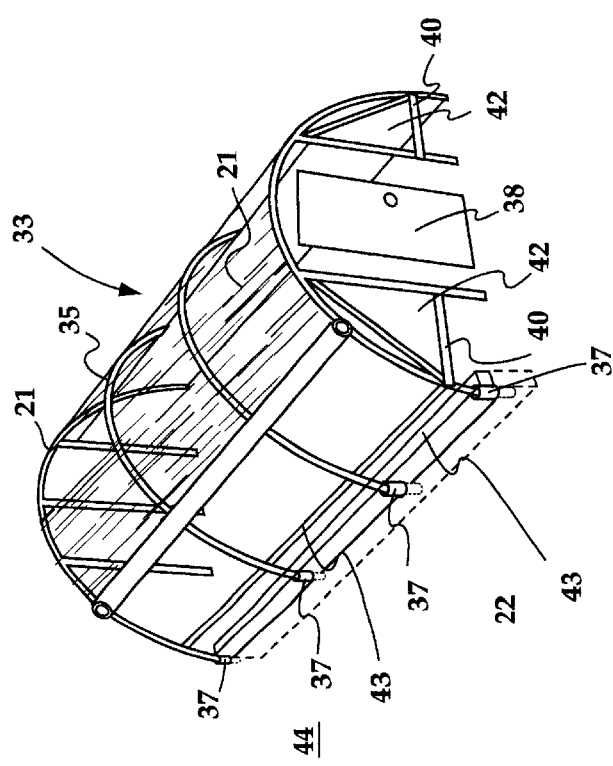
FIG. 4 provides a prospective view of a green house frame work over which the cover of the present invention is draped.

FIG. 4 depicts the structure 33 on which the cover 21 would be used. The structure 33 as depicted in FIG. 4 has thin narrow flexible support or suspension arches 35 which form an arched array. The thin narrow flexible suspension arches 35 can be made from any suitable metal or plastic rods or tubing or similar material. In the preferred embodiment the rods or tubing can be made up of thin narrow flexible PVC tubing or aluminum piping. Flexible aluminum piping used for electrical conduits provides one construction material suitable for forming the frame work of the greenhouse. The aluminum piping 35 which forms the support structure for the cover 21 can be anywhere from one half inch to two inches (½" to 2") in diameter. The aluminum piping is bent into an approximate semi-circular shape as depicted in FIG. 4 and then secured at its ends in securing devices 37. FIG. 4 depicts a hobby greenhouse which would be approximately twelve feet wide and twenty feet long. In this configuration the support pipes or tubes 35 would have a total length of approximately 20 feet from end to end. Two pipes or tubes 35 ten (10) feet long each could be connected to form the 20 foot length. In this structure a total of four separate arched support pipes or tubes 35 each 20 feet long would be used. If PVC piping or similar type of plastic piping is used it would more likely spring back to its original shape when it is removed. However, aluminum piping would retain its curved shape. Also, in order to bend the aluminum pipe a vise or other type of similar device would have to be used to gradually bend the aluminum pipe along its length to the appropriate curvature.

The ends of the greenhouse would be closed off as depicted in FIG. 4. FIG. 5 depicts another view of one end of the green house. It could have a door 38. It could also have 2×4's 40 forming the frame of the end with any type of rigid insulation 42 filling in the spaces between the wood frame structure 40 of the end. The spaces between the framing 40 would naturally be filled in with rigid insulating material 42 to form a barrier to close off the end of the greenhouse. Styrofoam insulation or a similar type of insulation used to insulate the foundation of a house provides one type of foam insulation which can be used to close off the end of the greenhouse.

Figure 6:
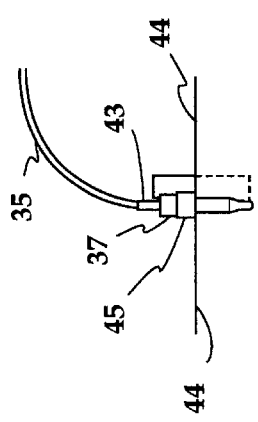
FIG. 6 provides a view of a securing device which holds the end of the arch supports and FIG. 7 provides a view of an alternate version of the invention in which the UV reflective and protective layer is on a separate sheet.

The ends of the flexible support piping 35 fit into the open ends of a securing pipe or cylinder 37. The securing pipe 37 in the preferred embodiment is an inch and a half to two inches (1½" to 2") in diameter and six to ten inches (6" to 10") long. The flexible support pipe 35 has a diameter in the preferred embodiment of from one half inch to an inch and a half (½" to 1½") and typically is from 20 to 25 feet in length. The length depending on how much of an area you want to span and how high you want to make the greenhouse at its center. In the preferred embodiment as described herein the greenhouse at its center would be six feet to six and one-half feet (6' or 6½') high. A base plate or plank 43 runs along each side of the greenhouse. A portion of the base plate or plank 43 extends into the ground 44 as depicted in FIG. 6. In the preferred embodiment it would extend at least four to five inches (4" to 5") into the ground along the entire bottom edge of the base plate 43. The base plate 43 would be a pressure treated piece of lumber generally a 2" by 10" by 20' or two or more planks of lumber which when secured end to end extend 20'.

The securing pipe 37 in the preferred embodiment would also extend into the ground 44. The length could vary but at least three or four (3" or 4") inches would extend into the ground to provide the necessary structural support. In the preferred embodiment the securing pipe 37 attaches to the base plate 43 by clamps 45. The parts as described working together give the greenhouse its shape and structural integrity.

The cover 21 of the present invention would then be rolled 22 over the frame as depicted in FIG. 4. The cover 21 would be rolled completely over the top of the greenhouse and secured at its ends. The cover 21 would be connected at its ends by tape or fasteners to the base plate 43. The sealed border 23 provides an ideal means for attaching the end of the cover 21. The cover 21 could also extend to the ground and stones, rocks or other items could be placed on top of the edge 23 of the cover 21 which extends to the ground to hold it in place. Naturally, the cover 21 would be extended over the entire structure of the greenhouse during cold weather when one wanted to maintain a high enough temperature during colder parts of the year to protect plants within the greenhouse. During colder parts of the year a small space heater running on electricity, kerosene, other hydrocarbonants or other similar type of heat could be placed within the greenhouse to maintain high enough temperature to protect the plants within the greenhouse. Additionally, on cold nights or during days when a heavy cloud cover exists a thermal blanket 47 could be rolled over the top of the cover 21 to provide additional insulating affect when the sun is not able to heat the interior of the greenhouse. An indoor/outdoor carpeting or similar material could act as the thermal blanket.

The interior or exterior surface of the cover 21 can be treated to achieve a number of desirable properties. The interior surface could be treated to reflect infrared radiation contained within the interior but allow the passage of infrared radiation into the interior of the greenhouse. Additionally, the interior surface of the cover can be treated to prevent condensation of moisture on the interior surface of the cover of the greenhouse. Given the substantial temperature and humidity differentials which would occur in colder weather treating the interior surface to prevent condensation would have a significant and beneficial effect. It would leave the cover clearer so the maximum amount of sunlight would penetrate into the interior of the greenhouse.

Figure 7:
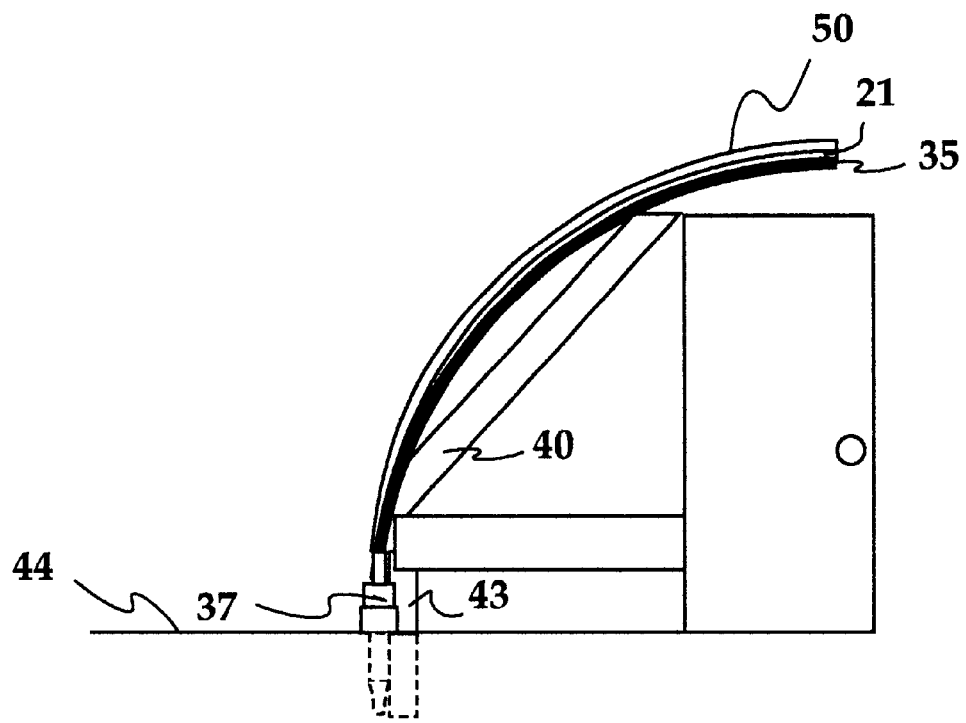

As an alternative to a UV coating on one side of the cover 21 a separate sheet of plastic 50 with UV reflective qualities could be placed over the cover 21 see FIG. 7. Additionally, those skilled in the art would readily see that in warmer weather when the cover is not necessary it can be easily removed from the structure and the plants within the greenhouse allowed to grow and avoiding the necessity of removing the plants from the greenhouse during hot weather.

While the invention has been particularly shown and described with reference to a preferred embodiment thereof, it will be understood by those skilled in the art that various changes in form and detail may be made to it without departing from the spirit and scope of the invention.

What is claimed is:

1. A modular greenhouse comprising:
   a) a transparent cover, said cover having two thin flexible sheets which have sandwiched there between an array of chambers, said chambers provide an insulating space, said chambers being permanently sealed; walls of said chambers form a foldable and moveable connection between the sheets which allows said cover to be rolled, folded or spread out; at least one of the sheets is reflective of ultra-violet light and both sheets and the walls of the chambers allow the passage of light; and
   b) a frame work over which said cover can be draped to form a closed interior space within the frame work, whereby said cover provides a barrier which allows the passage of light into the closed interior space except for ultraviolet light which it reflects, and it insulates the interior space from loss of heat.

2. The structure of claim 1 wherein the chambers form a regular array.

3. The structure of claim 2 wherein the chambers are round.

4. The structure of claim 1 wherein the cover is transparent to infrared radiation passing through it into the greenhouse but reflective of infrared radiation within the greenhouse to thereby contain within the greenhouse infrared radiation in the interior of the greenhouse.

5. The structure of claim 1 wherein the chambers contain air.

6. The structure of claim 1 further comprising a framework of a greenhouse over which the cover can be spread, said frame work includes a multitude of thin narrow flexible suspension arches positioned in a sequential array thus forming an arched array, each suspension arch having a first and second end which are secured in place so that when the cover is spread out over the arched array it forms a canopy over the space beneath the arched array.

7. The structure of claim 6 further comprising a first base plate to which the first end of each suspension arch of the arched array is secured and a second base plate to which the second end of each suspension arch of the arched array is secured.

8. The structure of claim 7 further comprising a first insulating barrier with access door at a first end of the canopy and a second insulating barrier at a second end of the canopy whereby the canopy, the first and second base plates and the first and second insulating barriers form an enclosed interior space for retention of heat.

9. The structure of claim 8 further comprising a thermal blanket which can be spread out over the canopy during periods of extreme cold or absence of sun light to enhance retention of heat within the interior space of the canopy.

10. The structure of claim 1 wherein an interior surface of the cover is treated to prevent condensation.

11. The structure of claim 1 wherein one of the sheets being reflective of UV radiation comprises a third separate thin flexible translucent or transparent sheet reflective of UV radiation placed over the cover.

12. The structure of claim 3 wherein the chambers can have a diameter of from a quarter to half an inch (¼" to ½").

13. The structure of claim 12 wherein the chambers are no closer than a sixteenth of an inch (¹⁄₁₆").

14. The structure of claim 1 wherein the cover has a flat border formed around its edge.

15. The structure of claim 14 wherein the border is at least six inches (6") wide and extends around the entire edge of the cover and thereby provides a portion of the cover which can be used to secure the cover in a fixed position over the greenhouse.

16. The structure of claim 7 wherein the thin narrow flexible suspension arches are thin narrow flexible tubing or piping.

17. The structure of claim 16 wherein the thin narrow flexible tubing or piping is selected from the group consisting of PVC tubing or aluminum electrical conduit piping.

18. A method for providing a year round greenhouse with a thin light flexible easily removed cover, said method comprises:

providing a greenhouse cover made up of at least two thin flexible sheets of translucent or transparent material said sheets having an array of permanently sealed chambers positioned there between and which connect the sheets to each other;

providing a modular support structure having a plurality of arches in a sequential array of arches with a fist base plate at a foot of a first end of said arches and a second base plate at a second end of said arches;

spreading the cover over the array of arches to provide a covered interior space beneath the arches;

sealing off a first and second end of the array of arches; and thereby creating a protected thermally insulated interior space beneath the array of arches accessible to sunlight, wherein said cover can be spread over the array of arches during cold weather to provide the protected interior space and removed from the arches during warm weather.

19. The method of claim 18 including the further step of providing UV protective and reflective qualities to the cover.

20. The method of claim 18 including the further step of providing thermal insulation for the greenhouse during extremely cold or sunless periods.

* * * * *